United States Patent [19]

Slocum et al.

[11] Patent Number: 4,861,845
[45] Date of Patent: Aug. 29, 1989

[54] POLYMERIZATION OF FLUOROOLEFINS

[75] Inventors: Edgar W. Slocum, Wilmington, Del.; Aquiles C. Sobrero, Parkersburg, W. Va.; Robert C. Wheland, Wilmington, Del.

[73] Assignee: E. I. Du Pont de Nemours and Company, Wilmington, Del.

[21] Appl. No.: 166,484

[22] Filed: Mar. 10, 1988

[51] Int. Cl.$^4$ .................. C08F 2/34; C08F 14/18
[52] U.S. Cl. ........................... 526/68; 526/67; 526/88; 526/231; 526/247; 526/255; 526/913
[58] Field of Search ............. 526/231, 247, 255, 913, 526/67, 68, 88

[56] References Cited

U.S. PATENT DOCUMENTS

| | | | |
|---|---|---|---|
| 2,598,283 | 5/1952 | Miller | 526/255 X |
| 2,753,329 | 7/1956 | Kroll et al. | 526/255 X |
| 3,170,858 | 2/1965 | Muchlberg et al. | 526/255 X |
| 3,304,293 | 2/1967 | Fuhrmann et al. | 526/901 X |
| 3,493,530 | 2/1970 | Sianesi et al. | 526/255 X |
| 3,592,802 | 7/1971 | Scoggins et al. | 526/255 X |
| 4,012,573 | 3/1977 | Trieschmann et al. | 526/68 |
| 4,525,547 | 6/1985 | Kato et al. | 526/68 |
| 4,535,136 | 8/1985 | Wheland | 526/214 |
| 4,588,796 | 5/1986 | Wheland | 526/214 |

FOREIGN PATENT DOCUMENTS 6711121 10/1967 Netherlands ................... 526/247

Primary Examiner—Joseph L. Schofer
Assistant Examiner—F. M. Teskin

[57] ABSTRACT

The polymerization of fluoromonomers can be accomplished without fouling by using gaseous monomers in the presence of at least one nonvolatile initiator and by recycling the initiator-free polymerizer gases through an external cooler.

8 Claims, 1 Drawing Sheet

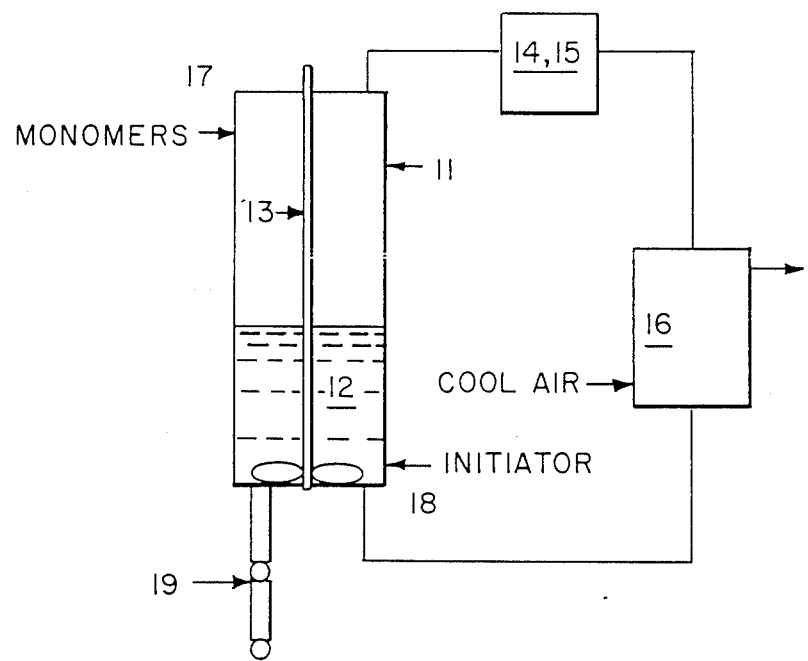

POLYMERIZATION OF FLUOROOLEFINS

BACKGROUND OF THE INVENTION

Field of the Invention

This invention relates to a process for polymerizing fluoroolefins in the gas phase.

References

Polymerization of tetrafluoroethylene (TFE) in the gas phase in the presence of nonvolatile initiators is known. For example, U.S. Pat. No. 3,592,802 discloses gaseous polymerization of TFE at about 40° to 120° C. in the presence of selected di(saturated hydrocarbyl) peroxydicarbonates such as diisopropylperoxydicarbonate, preferably supported on a suitable carrier material such as polytetrafluoroethylene. U.S. Pat. No. 3,304,293 discloses gas phase polymerization of TFE employing heat-activated gels of silica or silica-alumina admixed with salts of oxy acids of hexavalent chromium, such as magnesium chromate. U.S. Pat. No. 3,170,858 discloses gaseous polymerization of TFE, or copolymerization thereof with minor amounts of other fluoroolefins such as hexafluoropropene or vinylidene fluoride, in the presence of previously irradiated TFE homopolymer.

Use of nonvolatile initiators, including fluorinated oligomers, in condensed phase polymerization of TFE is also known. For example, U.S. Pat. No. 3,493,530 discloses polymerization of perfluorinated olefins in the presence of macromolecular perfluorinated polyperoxides of the formula $(C_3F_6O_x)_n$ wherein n is an integer of 5 to 100, the initiators being soluble in the liquid polymerization media. The use of TFE/ether- or HFP/ether-peroxide copolymers which are nonvolatile oils as initiators for fluoroolefin polymerization is disclosed in Dutch Application No. 6,711,121. U.S. Pat. No. 2,598,283 discloses copolymerization of TFE and HFP employing bis-trichloroacetyl peroxide at low temperatures in a prehalogenated hydrocarbon solvent. U.S. Pat. Nos. 4,535,136 and 4,588,796 disclose solution polymerization of fluoroolefins employing acyl hypofluorite initiators of the formula RCOOF or $X(CF_2)_n$ COOF wherein R is $X(CF2)n$- or $CF_3CF_2CF_2O[CF(CF_3)CF_2O]_mCF(CF_3)$-, X is H or F, m is 0 to 50 and n is 1 to 16.

U.S. Pat. No. 2,753,329 discloses gaseous polymerization of TFE employing peroxide and peracetate catalysts which reportedly produce a fluidizable, powdery polymer which does not adhere to the reactor walls. Polymerization is carried out at a temperature of about 125° to about 200° C. and a pressure of at least 100 psi (690 kPa). Under these process conditions, more than 99% of the catalyst is said to be present in the vapor phase.

Prior art processes for polymerizing fluoroolefins in the gas phase sometimes employ inert gases or vapors as heat transfer media to remove heat of polymerization. Although recycle of monomers has not been reported for cooling fluoroolefin polymerization, recycle has been employed with non-halogenated monomers. U.S. Pat. No. 4,525,547 discloses recycle of unreacted monomers through external heat exchangers to remove heat of polymerization in the gas phase polymerization of ethylene. Copolymerization of ethylene with other α-olefins employing a non-volatile (liquid or solid) coordination catalyst, an inert gaseous hydrocarbon diluent, and recycle of unreacted monomers through an external heat-exchanger is disclosed. The process reportedly results in, among other things, "reduced polymer deposition on the inner wall of the polymerization vessel, the prevention of lumpy polymer formation, and the proceeding of uniform copolymerization reaction".

In most, if not all, gas phase fluoroolefin polymerization processes of the art, reactor fouling and plugging is a major problem, requiring frequent and costly shutdowns. The present invention provides a continuous gas phase fluoroolefin polymerization process that substantially avoids fouling and plugging of polymerizer equipment and provides a free-flowing particulate fluoropolymer product of high stability.

SUMMARY OF THE INVENTION

This invention provides a process for preparing fluorinated polymers comprising (co)polymerizing at least one gaseous fluoroolefin monomer (fuoromonomer) in the presence of a non-volatile halogenated initiator, said process being further characterized in that heat is removed primarily by recycling initiator-free polymerizer gases through an external cooler (heat exchanger). The process avoids fouling of the polymerizer and the cooler by agglomerated polymer; facilitates trouble-free continuous operation; and provides a free-flowing particulate product of high quality. Preferably at least one fluoromonomer is perfluorinated. Optionally, gases which are inert under polymerization conditions may be used as diluents, and gaseous chain-transfer agents may also be employed as desired to control moleculare weight.

DETAILED DESCRIPTION OF THE INVENTION

Heat removal in the polymerization of fluoroolefins is especially important for safe control of the reaction. For example, the heat of polymerization of TFE is 37 kcal/mole as compared with 23 kcal/mole for ethylene and 21 kcal/mole for propylene. In the present process, heat of polymerization is effectively removed by continuously recycling a portion of the polymerizer gases through an external heat exchanger.

Initiators commonly used in the free-radical polymerization of fluoroolefins, such as perfluoropropionyl peroxide, are relatively volatile and would therefore be present in the recycle gases and result in polymerization therein, with subsequent particle agglomeration and fouling. In the present process, a non-volatile initiator which cannot enter the recycle stream is employed. Consequently, polymerization on, and fouling of, cooled heat exchanger surfaces is avoided. Continuous polymerization for long periods of time without fouling of the heat exchanger of the reactor has been achieved using the process of the invention.

Use of selected reactive, non-volatile initiators which permits polymerization at relatively low temperatures is especially preferred in the present process. Such initiators further assist polymerization heat control, but more importantly, provide a fluoropolymer product of high thermal stability in many cases. Certain fluoromonomers, for example, perfluoropropylvinyl ether, a preferred comonomer, undergo chain transfer reactions during polymerization which generate undesirable (thermally unstable) acyl fluoride end groups. Such chain transfer reactions increase with increasing temperature. Thus, such monomers should preferably be polymerized at relatively low temperatures, normally below about 100° C., preferably below about 60° C.

Removal of polymerization heat while maintaining adequate productivity at these lower temperatures is most effectively achieved by monomer recycle through an external heat exchanger.

The present process can be operated in a temperature range of about 30° to about 200° C., preferably about 40° to about 80° C. Reactor pressure may be in the range of about 50 to about 1000 psi (345–6900 kPa), preferably about 200 to about 400 psi (1380–2760 kPa); Monomer pressure will normally account for most of the total reactor pressure.

Fluoroolefins operable in the present process will in general be those which are homopolymerizable or copolymerizable by a free-radical mechanism. Such fluoromonomers include perfluoroolefins, particularly tetrafluoroethylene (TFE), perfluoroalkylvinyl ethers ($C_{1-4}$ alkyl), perfluoropropene, perfluoro-2,2-dimethyldioxole, perfluoro-2-methylene-4-methyl-1,3-dioxolane, and partially fluorinated monomers, particularly vinylidene fluoride, trifluoroethylene, chlorotrifluoro-ethylene and perfluorobutylethylene. Copolymerization of fluoroolefins, especially TFE, with other halogenated or non-halogenated monomers such as ethylene, is a preferred embodiment of this invention. Especially preferred is the copolymerization of TFE and perfluoropropylvinyl ether (PPVE) wherein the weight ratio of TFE to PPVE is at least 9 to 1.

Initiators which are suitable for use in the present process are non-volatile (i.e. negligible vapor pressure under polymerization conditions) free-radical sources. Preferred initiators are perhalogenated, most preferably perfluorinated, initiators. Non-volatile perfluoroether peroxides, such as those formulated below in Control Experiment B, wherein n is greater than 2, or those having the structure $[CF_3(CF_2)_nCOO]_2$ wherein n is greater than 8, or $[CCl_3COO]_2$, are especially suitable.

Diluent vapors which are inert under polymerization conditions may optionally be employed. Suitable diluents include inert gases such as carbon dioxide, nitrogen or helium, or fluorinated saturated compounds such as sulfur hexafluoride, tetrafluoromethane or hexafluoroethane.

Use of chain transfer agents is also contemplated when lower or controlled molecular weight polymers are desired. Suitable agents include vapors having weakly exchangeable hydrogen or halogen atoms. Examples are hydrogen, methyl chloride or trifluoroacetylchloride.

In the following experiments and example, parts are by weight and temperatures are in degrees Celsius unless otherwise indicated. Control Experiment A shows, in monomer recycle cooling, that series fouling occurs when a volatile initiator is used. Control Experiment B shows that fouling is greatly reduced, but not eliminated, when an only slightly volatile initiator is used. The Example demonstrates the complete absence of fouling when a non-volatile initiator is employed in the process of the invention.

DESCRIPTION OF DRAWING

A schematic flow diagram is shown in the attached figure.

A 300 cc glass pressure vessel 11 was used as a reactor, allowing visual observation of polymerization in progress. A bed of finely divided polymer 12 within the reactor was agitated mechanically with impeller 13. Alternatively, the bed could be agitated by fluidization with recycle gases. The vapor phase was taken overhead to a cyclone 14 (also glass for easy observation) to remove polymeric particulates, passed through blower 15 to heat exchanger 16 (an air cooled metal tube) to remove heat of reaction, and then returned to the reactor. As polymerization proceeded, monomers were replaced via feed tube 17. Initiators were added as solutions in inert solvents such as "Freon" 113 or "FC"—75 via tube 18. Solid polymeric product was removed from the reactor through lock hopper 19 consisting of two ball valves with a storage pressure let down space in between.

The reactor system outlined above is exemplary and not meant to be limited to the particular mechanics of monomer and initiator introduction, product agitation, gas recycle and cooling, and product removal shown. The process of the present invention essentially provides a means for removing polymerization heat by monomer recycle while avoiding fouling of equipment with polymeric deposits.

CONTROL EXPERIMENT A

Heavy Fouling/Volatile Initiator

The reactor was loaded with 15 g of granular TFE/-Perfluoropropylvinyl ether (PPVE) copolymer, 100 psig (6900 kPa) nitrogen, 200 psig (1380 kPa) TFE (300 psig (2070 kPa) total), and PPVE until the vapor phase analysed 77% TFE, 8% PPVE, and 15% nitrogen by gas phase chromatography. The reactor was heated to 90°–100°C.; the mechanical stirrer started at 205 rpm; gas started circulating gently though the recycle loop; and then a "Freon" 113 solution of 0.21M perfluoropropionyl peroxide initiator was injected at 2 to 3 mL/h as needed. Within 22 minutes a light buildup of polymer was noticeable on the walls of the cyclone. After 33 minutes, polymer buildup threatened to close the exit line of the reactor. Initiator feed had to be discontinued after 105 minutes. The equipment was shut down and inspected. Parts of the cyclone had 1/16" (1.6 mm) thick deposits of polymer, and the cyclone further retained several large sheets of polymer that appeared to have been detached from a surface. A total of 48.9 grams of new polymer were recovered from the reactor and associated parts.

CONTROL EXPERIMENT B

Trace Fouling/Slightly Volatile Initiator

The reactor was loaded with 151.1 g of TFE/PPVE copolymer, 100 psig (690 kPa) nitrogen, 200 psig (1380 kPa) TFE (300 psig (2070 kPa) total), and PPVE to bring the gas phase to 79% TFE, 6% PPVE, and 15% nitrogen. The reactor was heated to 80° C.; the impeller started; and the gas phase gently recirculated. Initiator solution: 0.097M of the initiator of Formula 1* where n=1 in "Freon" 113, was injected at 7.5 mL/h. Fifty minutes into the run a small amount of polymer could be seen on the walls of the cyclone as small particulates. After 122 minutes, the initiator feed was stopped and the reactor shut down and inspected. The cyclone was largely clean except for some spotty particulates running along about 1" of the upper surface. A total of 49.7 g of TFE/PPVE copolymer was made for a productivity of 0.7 lbs/gallon-hour (83.9 kg/m$^3$-h) and a polymer production of 14,500 g of polymer/g mole of radicals.

* Formula 1 is $\{CF_3CF_2CF_2O[CF(CF_3)CF_2O]_nCF(CF_3)COO\}_2$

EXAMPLE

No Fouling/Non-volatile Initiator

The reactor was loaded with 163.9 g of TFE/PPVE copolymer, 100 psig (690 kPa) of nitrogen, 200 psig (1380 kPa) of TFE (300 psig (2070 kPa) total), and PPVE to bring the gas phase to 80 wt percent TFE, 7% PPVE, and 13% nitrogen. The reactor was heated to 84° C., the impeller was started, and the gas phase gently recirculated as the initiator, 0.088M of Formula 1* where n=5.9, in "Freon" 113 was added first at 5.0 mL/h and then at 7.5 mL/h. Recirculation continued smoothly for 99 minutes with no visible deposit on the walls of the cyclone. Recirculation was terminated and the reactor was shut down 37 minutes later. The cyclone, the walls of the reactor, and the impeller were all essentially free of adherent polymer. A total of 43.0 g of new polymer were made in this run for a productivity of 0.49 lbs/gallon-hour (58.7 kg/m$^3$-h) and a polymer production of 15,500 grams/gm mole of radicals.

* Formula 1 is $\{CF_3CF_2CF_2O[CF(CF_3)CF_2O]_nCF(CF_3)COO\}_2$

The invention being claimed is:

1. In a continuous, free-radical initiated process for preparing fluorinated polymers comprising polymerizing at least one gaseous fluoroolefin in a stirred polymerizer, the improvement consisting essentially of removing polymerization heat by recycling polymerizer gases through an external heat exchanger and the initiator used for polymerization is not capable of entering the recycle gas stream.

2. A process as in claim 1 wherein said initiator is perhalogenated.

3. A process as in claim 2 wherein said initiator is perfluoroether peroxide having the formula $\{CF_3CF_2CF_2O[CF(CF_3)CF_2O]_nCF(CF_3)COO\}_2$ wherein n is greater than 2.

4. A process as in claim 3 wherein n=5.9.

5. A process as in claim 1 wherein the fluoroolefin includes TFE.

6. A process as in claim 1 where TFE is the sole gaseous fluoroolefin.

7. A process as in claim 5 wherein said at least one gaseous fluoroolefin comprises TFE and PPVE.

8. A process as in claim 7 wherein the weight ratio of TFE to PPVE is at least 9 to 1.

* * * * *